United States Patent
Vargantwar et al.

(10) Patent No.: US 8,406,773 B1
(45) Date of Patent: Mar. 26, 2013

(54) ADAPTIVE POWER CONTROL BASED ON RADIO FREQUENCY CONDITIONS

(75) Inventors: Sachin R. Vargantwar, Overland Park, KS (US); Bhagwan Khanka, Lenexa, KS (US); Manoj Shetty, Overland Park, KS (US); Jasinder P. Singh, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 324 days.

(21) Appl. No.: 12/782,513

(22) Filed: May 18, 2010

(51) Int. Cl.
*H04W 36/00* (2009.01)

(52) U.S. Cl. ........ 455/442; 455/522; 455/524; 455/525; 455/435.1; 455/435.2; 455/452.2; 455/455; 455/464

(58) Field of Classification Search .................. None
See application file for complete search history.

(56) References Cited

U.S. PATENT DOCUMENTS

| | | | |
|---|---|---|---|
| 6,088,324 A * | 7/2000 | Sato | 370/203 |
| 6,788,959 B2 * | 9/2004 | Jokinen et al. | 455/552.1 |
| 7,292,856 B2 * | 11/2007 | Julian et al. | 455/436 |
| 2002/0115465 A1 * | 8/2002 | Komatsu | 455/522 |
| 2003/0045321 A1 * | 3/2003 | Kim et al. | 455/522 |
| 2004/0235510 A1 * | 11/2004 | Elicegui et al. | 455/522 |
| 2006/0046735 A1 * | 3/2006 | Gross et al. | 455/452.2 |
| 2007/0129096 A1 * | 6/2007 | Okumura et al. | 455/522 |
| 2008/0069270 A1 * | 3/2008 | Tyra et al. | 375/317 |

* cited by examiner

*Primary Examiner* — Rafael Pérez-Gutiérrez
*Assistant Examiner* — Suhail Khan

(57) ABSTRACT

Methods and computer-readable media are provided to enable the selection of a cell tower sector that is used by the mobile device to provide higher quality signals in a current frame. Signal quality data is retrieved for a previous quantity of frames, and indicates the signal quality of signals communicated from multiple sectors to a mobile device during soft handoff. A sector that has been communicating higher quality signals is then selected. Loading, signal-to-noise ratio, and a number of traffic channels may be used independently or in conjunction to determine which sector to select. For time slots of a current frame, an overall power control command is communicated to each sector that corresponds to a power control command assigned to the selected sector.

15 Claims, 7 Drawing Sheets

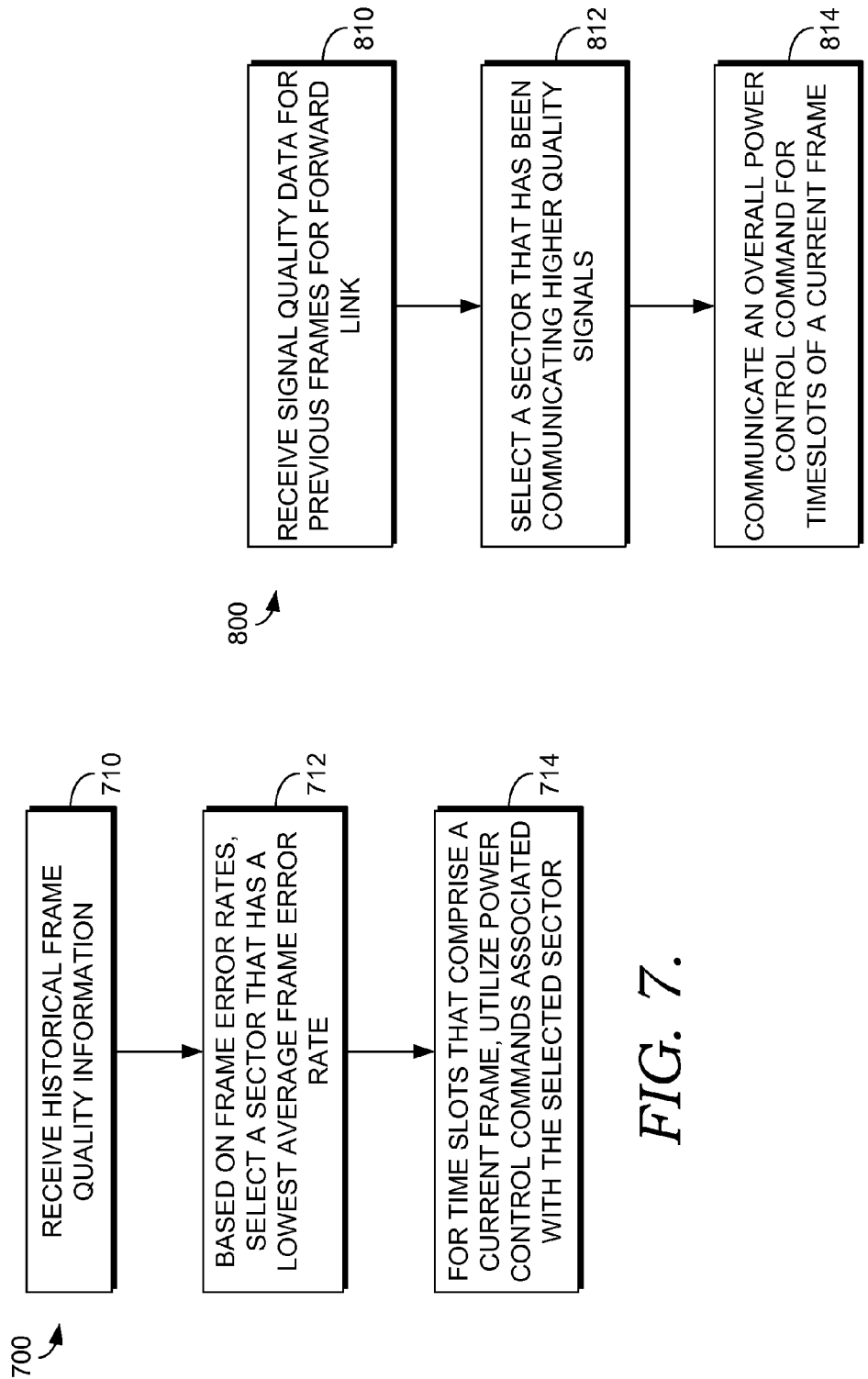

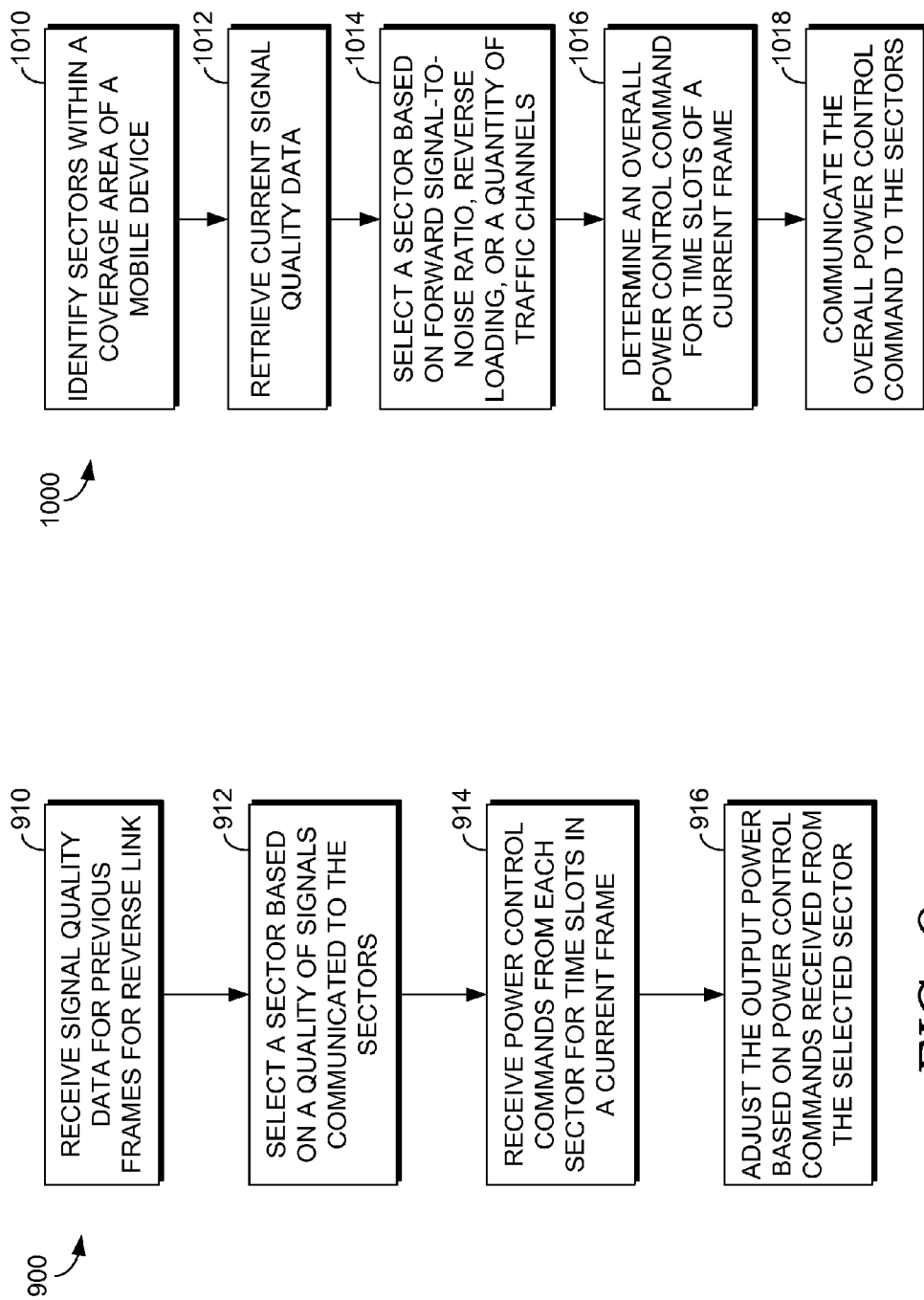

ADAPTIVE POWER CONTROL BASED ON RADIO FREQUENCY CONDITIONS

CROSS REFERENCE TO RELATED APPLICATIONS

This application is related by subject matter to the invention disclosed in the following U.S. patent application filed on even date herewith: U.S. application Ser. No. 12/782,507, entitled "ADAPTIVE POWER CONTROL," which is assigned or under obligation of assignment to the same entity as this application, and incorporated in this application by reference.

SUMMARY

Embodiments of the invention are defined by the claims below, not this summary. A high-level overview of various aspects of the invention are provided here for that reason, to provide an overview of the disclosure and to introduce a selection of concepts that are further described below in the detailed-description section. This summary is not intended to identify key features or essential features of the claimed subject matter, nor is it intended to be used as an aid in isolation to determine the scope of the claimed subject matter.

In brief and at a high level, this disclosure describes, among other things, methods, systems, and computer-readable media for enabling the selection of a sector to bias for forward and reverse power control during soft handoff. Signal quality data, such as loading, signal-to-noise ratio, or a quantity of traffic channels are used either individually or in combination to determine which sector has been and will provide the best signals in the current frame. For instance, signal quality data received may be associated with a previous quantity of frames, such as the past twenty frames. Depending on whether it is forward or reverse power control, the mobile device will either obey the power control commands sent from the selected or biased sector, or will use the power control commands sent from the selected or biased sector to determine the overall power control command that is sent to each sector for each time slot of the current frame. Alternatively or in conjunction with historical signal quality information, current signal quality information may also be used.

Accordingly, in one aspect, one or more computer-readable media storing computer-useable instructions that, when used by one or more computing devices, cause the one or more computing devices to perform a method. The method includes receiving signal quality data for a predetermined quantity of previous frames. The signal quality data indicates a quality of signals communicated to a mobile device from a first sector and a second sector. The method further includes, based on the signal quality data, selecting a sector from the first sector and the second sector that is communicating higher quality signals. The signal quality data includes one or more of loading, a signal-to-noise ratio, or a quantity of traffic channels. For each time slot that comprises a current frame, an overall power control command is communicated to each of the first sector and the second sector that corresponds to a power control command associated with the selected sector.

In another aspect of the invention, one or more computer-readable media storing computer-useable instructions that, when used by one or more computing devices, cause the one or more computing devices to perform a method. The method includes receiving signal quality data for a predetermined quantity of previous frames. The signal quality data indicates a quality of signals communicated from a mobile device to a first sector and a second sector. Additionally, the method includes selecting a sector of the first sector and the second sector based on whether the signals communicated to the first sector or to the second sector are of a higher quality. Further, the method includes receiving power control commands from each of the first sector and the second sector for each time slot that comprises a current frame and adjusting an output power corresponding to the signals communicated to the first sector and the second sector from the mobile device in a current frame according to the power control commands received from the selected sector.

In a further aspect of the invention, one or more computer-readable media storing computer-useable instructions that, when used by one or more computing devices, cause the one or more computing devices to perform a method. The method includes, during a soft handoff, identifying two or more sectors within a coverage area of a mobile device. Current signal quality data is retrieved for signals received from the two or more sectors. Further, the method includes selecting a sector from the two or more sectors based on the current signal quality data that indicates one or more of forward signal-to-noise ratio, reverse loading, or a quantity of traffic channels, and determining an overall power control command for a plurality of time slots that comprise a current frame. The overall power control command corresponds to a power control command associated with the selected sector. Additionally, the method includes communicating the overall power control command to the two or more sectors.

BRIEF DESCRIPTION OF THE SEVERAL VIEWS OF THE DRAWINGS

Illustrative embodiments of the present invention are described in detail below with reference to the attached drawing figures, wherein:

FIG. 7 depicts a flowchart of a method for using historical frame quality information to determine how to adjust power output, in accordance with an embodiment of the present invention;

FIG. 8 depicts a flowchart of a method for forward power control using previous signal quality data, in accordance with an embodiment of the present invention;

FIG. 9 depicts a flowchart of a method for reverse power control using previous signal quality data, in accordance with an embodiment of the present invention; and FIG. 10 depicts a flowchart of a method for forward power control using current signal quality data, in accordance with an embodiment of the present invention.

DETAILED DESCRIPTION

The subject matter of the present invention is described with specificity herein to meet statutory requirements. However, the description itself is not intended to define the invention, which is what the claims do. Rather, the claimed subject matter might be embodied in other ways to include different steps or combinations of steps similar to the ones described in this document, in conjunction with other present or future technologies. Moreover, although the term "step" or other generic term might be used herein to connote different components or methods employed, the terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| BTS | Base Transceiver Station |
| CDMA | Code Division Multiple Access |
| CRC | Cyclic Redundancy Code |
| CSCF | Call Session Control Function |
| FER | Frame Error Rate |
| GSM | Global System for Mobile communications (Groupe Spécial Mobile) |
| HTTP | Hypertext Transfer Protocol |
| LED | Light Emitting Diode |
| PDA | Personal Data Assistant |
| TDMA | Time Division Multiple Access |
| UMTS | Universal Mobile Telecommunications System |

Further, various technical terms are used throughout this description. An illustrative resource that fleshes out various aspects of these terms can be found in Newton's Telecom Dictionary by H. Newton, 25th Edition (2009).

Embodiments of the present invention may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to, information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
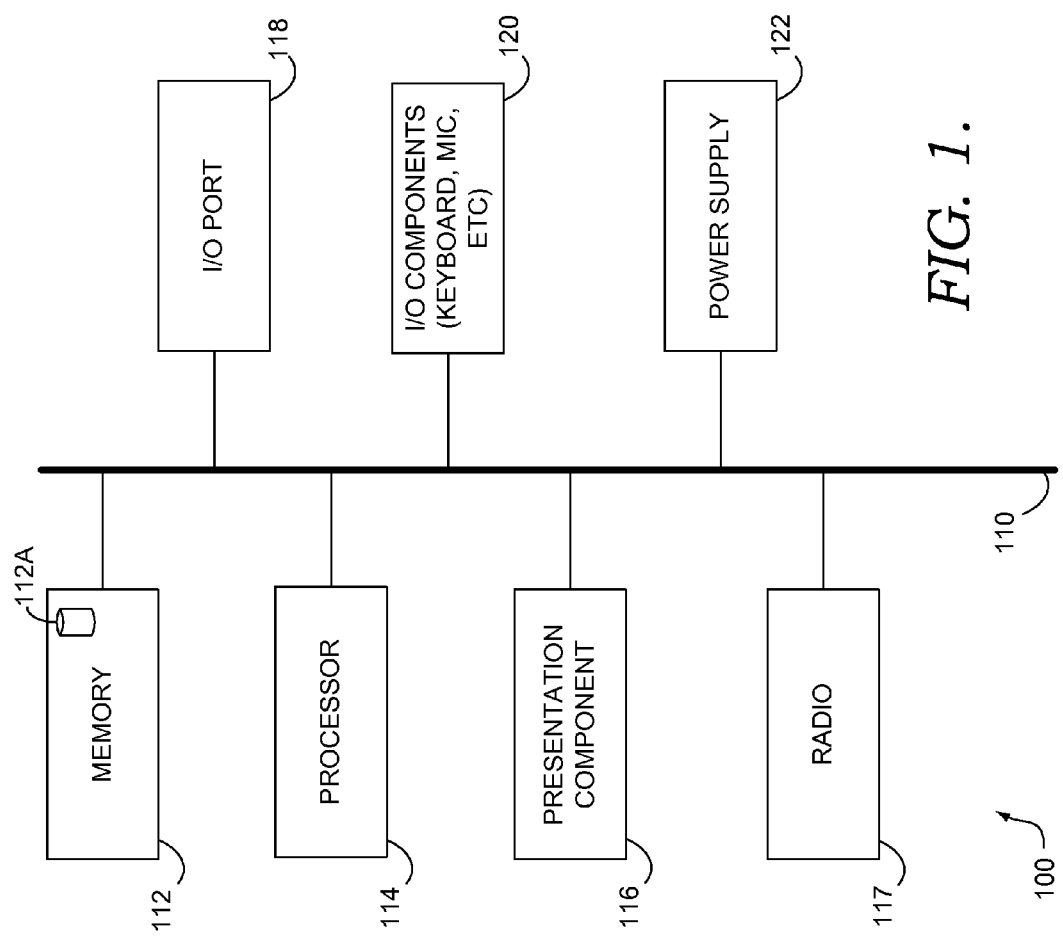
FIG. 1 depicts an illustrative device suitable for use in connection with an embodiment of the present invention.

Turning now to FIG. 1, a block diagram of an illustrative mobile computing device ("mobile device") is provided and referenced generally by the numeral 100. Although some components are shown in the singular, they may be plural. For example, mobile device 100 might include multiple processors or multiple radios, etc. A mobile device may be one of many devices, including, but not limited to, a mobile phone, a laptop, a PDA, a handheld device, etc. As illustratively shown, mobile device 100 includes a bus 110 that directly or indirectly couples various components together including memory 112, a processor 114, a presentation component 116, a radio 117, input/output ports 118, input/output components 120, and a power supply 122.

We previously have described various memory components that memory 112 might take the form of. Thus, we will not elaborate more here, only to say that memory component 112 can include any type of medium that is capable of storing information (e.g., a datastore 112A). Processor 114 might actually be multiple processors that receive instructions and process them accordingly. Presentation component 116 includes the likes of a display, a speaker, as well as other components that can present information (such as a lamp (LED), or even lighted keyboards).

Radio 117 is a radio that facilitates communication with a wireless telecommunications network. Illustrative wireless telecommunications technologies include CDMA, GPRS, TDMA, GSM, WIMAX, LTE, and the like. In some embodiments, radio 117 might also facilitate other types of wireless communications including Wi-Fi communications and GIS communications.

Input/output port 118 might take on a variety of forms. Illustrative input/output ports include a USB jack, stereo jack, infrared port, proprietary communications ports, and the like. Input/output components 120 include items such as keyboards, microphones, touch screens, and any other item usable to directly or indirectly input data into mobile device 100. Power supply 122 includes items such as batteries, fuel cells, or any other component that can act as a power source to power mobile device 100.

Figure 2:
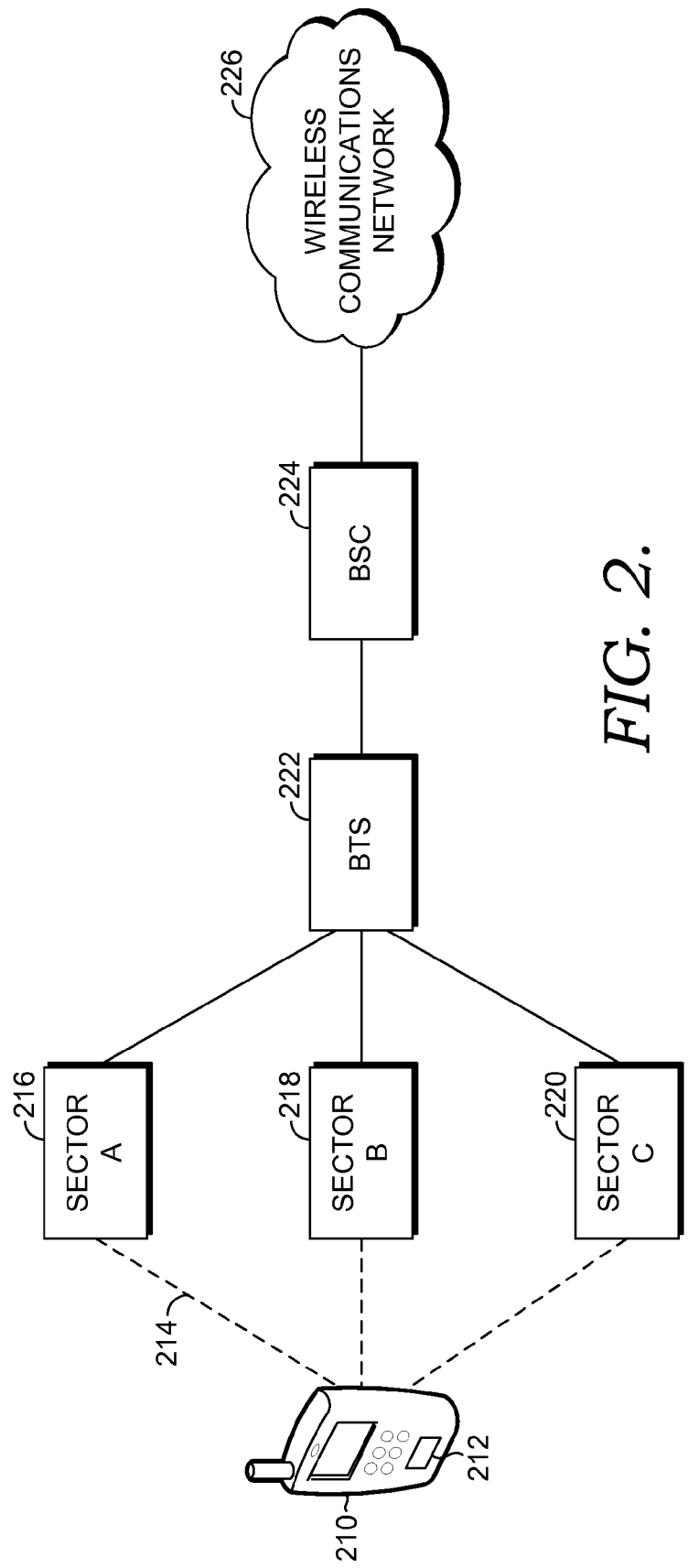
FIG. 2 depicts an illustrative operating environment suitable for practicing an embodiment of the present invention.

Turning now to FIG. 2, an illustrative operating environment is provided and referenced generally by the numeral 200, which depicts an illustrative networking environment that enables a mobile device or various sectors to adjust their power output based on received power control commands. Generally, a power control algorithm controls the adjustment of power for both the mobile device and various sectors. Embodiments of this invention allow the power control algorithm to be biased toward a particular sector during handoff state. Depending on whether the signaling link is forward or reverse, the mobile device either decides or is instructed which sector's power control commands to obey. Forward link, as used herein, refers to the link from a fixed location, such as a sector of a cell tower, to a mobile device. Reverse link, as used herein, refers to the link from a mobile device to a fixed base station, or a sector. The link refers to one of several types of information transmission paths, and may include data, such as a signal. A sector, as used herein, is a portion of a mobile cellular radio cell (e.g., cell tower). In one instance, a cell tower is divided into three sectors, each with a 120-degree coverage pattern. Generally, sectoring divides the number of channels assigned to the cell into smaller groups of channels, which are assigned to a sector through the use of directional antennas. Multiple sectors are discussed herein. In one embodiment, each sector comprises a single cell tower, and therefore a single base transceiver station (BTS) is used for the multiple sectors. In another embodiment, however, the sectors comprise two or more cell towers, and therefore more than one BTS is used, as a BTS may be present for each cell tower.

The components illustrated in FIG. 2 include a mobile device 210, three sectors, including a sector A 216, a sector B 218, and a sector C 220, a BTS 222, and a base station controller (BSC) 224. Mobile device 210 is the type of device described in connection with FIG. 1 in one embodiment. It includes a client application 212 that helps carry out aspects of the technology described herein. Whenever we speak of an application, software, or the like, we are really referring to one or more computer-readable media that are embodied with a set of computer-executable instructions that facilitate various actions to be performed. We will not always include this lengthy terminology because doing so would make this document more difficult to read. In one embodiment, the client application 212 receives signals sent from multiple sectors and based on the signal quality of each signal, determines an overall power control command to send to the sectors. BTS 222 provides the mobile device 210 access to what some skilled artisans refer to as a wireless communications network, also termed a core network. The item referred to in FIG. 2 by reference numeral 226 is not the only form of a wireless communications network that is possible. To the contrary, components that make up wireless communications network 226 are not shown, such as a packet data serving node (PDSN), an authentication, authorization, and accounting (AAA) server, etc. Also, not all components located outside the wireless communications network 226 are shown for simplicity purposes. In one embodiment, the BSC 224 provides the intelligence behind the BTS 222, and therefore, when we refer to various processes performed by the BTS 222, the BSC 224 may also be involved in some way.

Embodiments of the present invention are generally directed toward determining which sector the mobile device should bias, and thus, two or more sectors either receive or communicate signals from or to the mobile device. While FIG. 2 illustrates three sectors, sector A 216, sector B 218, and sector C 220, less or more than two sectors are contemplated to be within the scope of the present invention. For example, as mentioned above, two sectors may each send signals to a mobile device and the mobile device may determine which sector's power control command to obey. Alternatively, more than three sectors can also communicate signals to the mobile device using embodiments described herein. Further, as also mentioned above, a single BTS 222 is illustrated in FIG. 2, such that the three illustrated sectors are associated with a single cell tower. Other embodiments, however, contemplate that one or more of the sectors are associated with a different cell tower, and therefore that sector may use a different BTS. A single BTS is depicted in FIG. 2 for simplicity sake.

Figure 4:
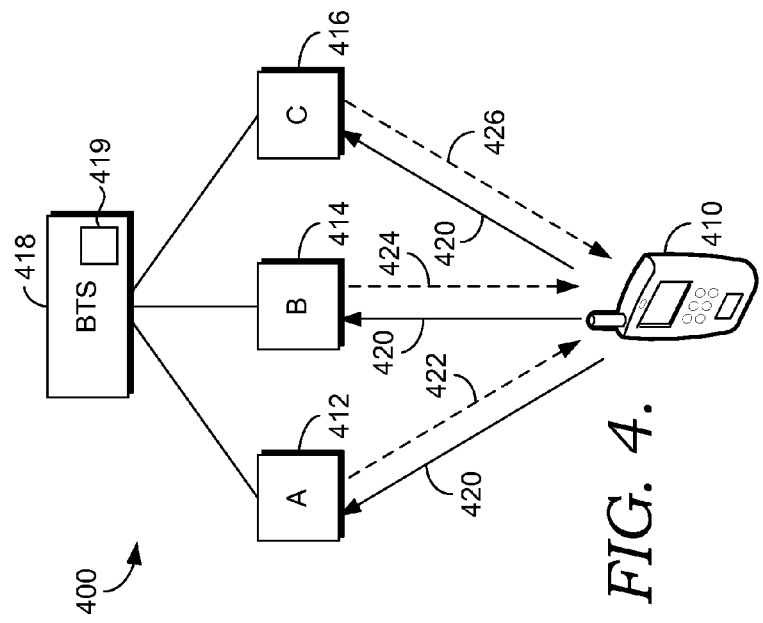
FIG. 4 depicts a system diagram of reverse power control, in accordance with an embodiment of the present invention.

Embodiments of the present invention take various forms, including both the control of power in the forward link and the reverse link. As mentioned, forward link is the communication of information from a sector to a mobile device, and therefore forward power control refers to the control of power of the forward link. Similarly, reverse power control refers to the control of power of the reverse link, or information communicated from the mobile device to a sector. Signals and power control commands communicated from the mobile device 210 to the sectors and from the sectors to the mobile device 210 are illustrated by the broken line 214. Particulars associated with forward and reverse power control are illustrated in FIGS. 3 and 4 and described herein.

Methods described herein allow for maximum frame quality for at least one of the sectors that is communicating to or receiving signals from a mobile device during soft handoff. Soft handoff occurs when a mobile device is simultaneously connected to two or more sectors or cells during a call. If the sectors are from the same physical cell site, it is termed softer handoff. As such, it is possible for a mobile device to receive signals from two or more base stations that are transmitting the same bit stream on different physical channels in the same frequency bandwidth. For instance, a mobile device may be moving away from an area covered by a first sector and entering the area covered by another sector. The call may be transferred to the second sector to avoid call termination when the phone is outside the range of the first sector. The methods disclosed herein allow for an increase in frame quality by selecting a sector to bias that has provided the highest signal quality.

Figure 3:
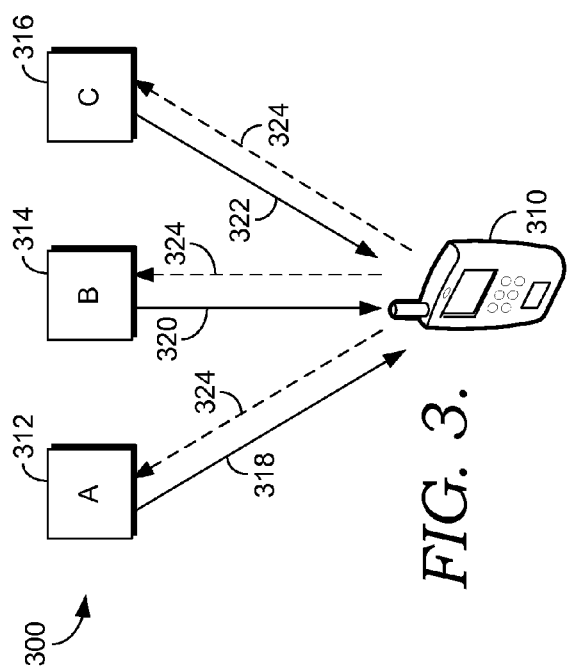
FIG. 3 depicts a system diagram of forward power control, in accordance with an embodiment of the present invention.

Turning now to FIG. 3, a system diagram is illustrated of forward power control, in accordance with an embodiment of the present invention, and referred to generally by numeral 300. The components illustrated in FIG. 3 include a mobile device 310, a sector A 312, a sector B 314, and a sector C 316. Three sectors are illustrated for exemplary purposes only. Embodiments of the present invention may include two or more sectors, and as such, two, or more than three sectors may be used to accomplish aspects of the present invention. When referring to forward power control, we are generally referring to the power control of signals communicated from a sector to a mobile device. In particular, the embodiment of FIG. 3 illustrates forward power control during soft handoff such that there are multiple sectors within a coverage area of the mobile device 310, and each may communicate a signal to the mobile device 310. Each sector communicates a signaling link (e.g., a signal) to the mobile device 310. Sector A 312 communicates signaling link 318, sector B 314 communicates signaling link 320, and sector C 316 communicates signaling link 322. In one embodiment, once the mobile device 310 receives each of the three signaling links 318, 320, and 322, it assigns a power control command to each signaling link and determines, based on the power control commands, which sector to bias. As used herein, the sector that is biased is the sector whose power control command the mobile device obeys. As such, if three sectors each have an associated power control command and the mobile device decides to bias sector A, the mobile device responds to each sector with the power control command associated with sector A.

In forward power control, the mobile device 310 receives three separate signaling links (signaling links 318, 320, and 322), and communicates one overall power control command, illustrated by item 324, to each of the three sectors. The mobile device 310, in one instance, is only capable of sending out one signal at a time, and as such, each sector receives the exact same information from the mobile device 310. Power control commands, as used herein, comprise either a power up command or a power down command. A power up command indicates that on a subsequent signal communicated from the sector to the mobile device, the power needs to increase to produce a higher quality signal. In one instance, a power up command is represented by a "1." A power down command indicates that on a subsequent signal communicated from the sector to the mobile device, the power needs to decrease, as the signal quality has met a certain quality threshold. In one instance, a power down command is represented by a "0." In one embodiment, in forward power control, the mobile device receives two or more signals from the sectors and evaluates each signal to determine whether each meets the quality threshold. In another embodiment, the mobile device actually receives power control commands from each sector that is transmitting a signal.

In embodiments, for forward power control, the mobile device determines an overall power control command based on assigned power control commands for each sector. Each frame comprises multiple power control slots. As shown in Table 1 below, the frame's length is 20 milliseconds (ms), and is divided into 16 time slots, also termed power control slots. As such, each time slot is 1.25 ms. Every 1.25 ms, in forward power control, the mobile device may inspect the signals (e.g., measure signal quality) received from each of sectors A, B, and C in that time frame to assign a power control command. For instance, if the signals received from sectors A and B for the first time slot both meet a quality threshold, the mobile device may assign a "0" power control command, which translates to a power down command. If the signal received from sector C for the first time slot does not meet the quality threshold, the mobile device may assign a "1" power control command, meaning power up, such that increasing the power output would likely increase the quality of the signal. However, the mobile device needs only one of the three signals sent from the three sectors to meet the quality threshold, and as such, even if only one of the three sectors' signals meets the quality threshold (e.g., is assigned a "0"), the mobile's reaction will be to power down, or a "0" reaction. In fact, as shown below, the mobile's reaction, or its response to each of the three sectors, is a "0" in each time slot except for the fifth time slot. In the fifth time slot, each of sectors A, B, and C have been assigned a "1," indicating that their respective signals do not meet a quality threshold. The mobile device therefore responds with a "1," instructing each of the three sectors to increase their power output for a subsequent signal transmission.

Returning now to FIG. 3, in an alternate embodiment than that described above, the mobile device determines which sector to bias for a particular frame based on a frame error rate for each sector for a particular quantity of previous frames. A frame error rate is used to test the performance of a mobile station's receiver. A sequence of frames is sent to the mobile station. Each frame contains cyclic redundancy code (CRC) bits, which provide frame quality indicator and allow the mobile station to verify that it has correctly decoded a frame. In one embodiment, the sector that has the lowest average frame error rate among a predetermined quantity of previous frames is selected as the sector that the mobile device will bias for the current frame. For example, for the past 100 frames, if sector B has the lowest frame error rate among these frames, the mobile device may select sector B as the sector it will bias for the current frame. Or, for the past 100 frames, if sector B was the sector that the mobile device biases for 90% of the frames, sector B is historically better than other sectors, and sector B may be selected as the bias sector for the current

TABLE 1

| | Frame - 20 ms | | | | | | | | | | | | | | | | |
|---|---|---|---|---|---|---|---|---|---|---|---|---|---|---|---|---|---|
| Slot - 1.25 ms | 1 | 2 | 3 | 4 | 5 | 6 | 7 | 8 | 9 | 10 | 11 | 12 | 13 | 14 | 15 | 16 | Frame Quality |
| Sector A | 0 | 0 | 0 | 0 | 1 | 0 | 0 | 1 | 0 | 1 | 0 | 0 | 1 | 0 | 0 | 0 | 25% |
| Sector B | 0 | 1 | 0 | 1 | 1 | 0 | 1 | 0 | 1 | 1 | 0 | 1 | 0 | 1 | 1 | 0 | 56% |
| Sector C | 1 | 0 | 1 | 1 | 1 | 1 | 0 | 1 | 1 | 0 | 1 | 0 | 1 | 1 | 0 | 1 | 69% |
| Mobile Reaction | 0 | 0 | 0 | 0 | 1 | 0 | 0 | 0 | 0 | 0 | 0 | 0 | 0 | 0 | 0 | 0 | |

While each time slot of each frame may be inspected to determine the mobile's reaction to the quality of signals received in each time slot, according to embodiments of the present invention, the mobile device inspects only a predetermined quantity of time slots, such as the first five time slots, and from this determines which sector to bias for the remainder of time slots that comprise this particular frame. This predetermined quantity may be any number of time slots less than the total number of time slots in a frame. For example, using the example illustrated in Table 2 below, the mobile device may determine, for the first five time slots, an overall power control command for each of these time slots. After the fifth time slot, the mobile device may determine which of the three sectors has communicated the highest quality signals. In one instance, this may be determined by selecting the sector that has been assigned the most power down, or "0" power control commands in the first five, or other predetermined quantity of time slots. In the instance of Table 2 below, sector A has 4 "0"s, sector B has 2 "0"s, and sector C has 1 "0" in the first five time slots, and therefore sector A would be selected as the sector that the mobile device would bias for the remainder of time slots of this particular frame. As shown, the mobile's reaction, or overall power control commands, to the power control commands received within time slots six through sixteen is the same as the power control command assigned to sector A for each of these time slots.

frame. Many methods of utilizing historical frame quality information are contemplated to be within the scope of the present invention. Those discussed above are provided for exemplary purposes only. While a quantity of 100 frames is used as an example above, the number of previous frames analyzed may vary.

FIG. 4 depicts a system diagram of reverse power control, in accordance with an embodiment of the present invention, and is referred to generally by numeral 400. Initially, when referring to reverse power control, we are generally referring to power control of the reverse link, or of signals communicated from a mobile device to a sector. In particular, the embodiment of FIG. 4 illustrates reverse power control during soft handoff such that there are multiple sectors within a coverage area of the mobile device 410, and each may receive a signal from the mobile device 410. For instance, in FIG. 4, the mobile device 410 communicates a signal 420 to each of sector A 412, sector B 414, and sector C 416. Generally, once the sectors receive the signal 420 from the mobile device 410, the BTS 418 inspects and analyzes these signals to determine whether each meets a quality threshold. The quality threshold may vary, and may be determined by a network component. The BTS 418, in one embodiment, assigns a power control command to each sector that has received a signal for each time slot of a frame. In one instance, a frame is 20 ms and each of sixteen time slots is 1.25 ms. The length of each frame and

TABLE 2

| | Frame - 20 ms | | | | | | | | | | | | | | | | |
|---|---|---|---|---|---|---|---|---|---|---|---|---|---|---|---|---|---|
| Slot - 1.25 ms | 1 | 2 | 3 | 4 | 5 | 6 | 7 | 8 | 9 | 10 | 11 | 12 | 13 | 14 | 15 | 16 | Frame Quality |
| Sector A | 0 | 0 | 0 | 0 | 1 | 0 | 0 | 1 | 0 | 1 | 0 | 0 | 1 | 0 | 0 | 0 | 25% |
| Sector B | 0 | 1 | 0 | 1 | 1 | 0 | 1 | 0 | 1 | 1 | 0 | 1 | 0 | 1 | 1 | 0 | 56% |
| Sector C | 1 | 0 | 1 | 1 | 1 | 1 | 0 | 1 | 1 | 0 | 1 | 0 | 1 | 1 | 0 | 1 | 69% |
| Mobile Reaction | 0 | 0 | 0 | 0 | 1 | 0 | 0 | 1 | 0 | 1 | 0 | 0 | 1 | 0 | 0 | 0 | | a number of time slots that comprise each frame may vary, and as such, other frame lengths are contemplated to be within the scope of the present invention.

As mentioned, the BTS 418 may be responsible for comparing each incoming signal to a target signal, and based on this, assigning a power control command to each sector for each time slot of a frame. While each time slot of each frame may be inspected to determine which sector the mobile device should bias, according to embodiments of the present invention, a determination as to which sector the mobile device should bias may be performed for only a predetermined quantity of time slots, such as the first five time slots. This predetermined quantity may be any number of time slots less than the total number of time slots in a frame. For example, the BTS 418 may determine, for the first five time slots, a power control command for each of these time slots and for each sector. After the fifth time slot, the BTS may determine which of the three sectors has received the highest quality signals. In one instance, this may be determined by selecting the sector that has been assigned the most power down, or "0" power control commands in the first five, or other predetermined quantity of time slots. Therefore, if sector A 412, for example, has been assigned more "0"s in the first five time slots than sector B 414 or sector C 416, sector A 412 would be selected as the sector that the mobile device should bias for the remainder of time slots of this particular frame.

In one aspect of the present invention, once the BTS 418 determines which sector the mobile device 410 should bias for the remainder of times slots for a particular frame, the BTS 418 communicates to the mobile device 410 the biased sector so that when the mobile device 410 receives power control commands from each sector, it knows that it should obey the power control command sent from the biased sector and ignore all others. Therefore, even though the mobile device 410, using the example presented above, will obey (e.g., adjust its power output) according to only the power control commands received from sector A 412, it will continue to receive power control commands from sectors B and C as well. Regardless of which power control command is received from sector B 414 or sector C 416, the mobile device will obey the power control command sent from sector A 412.

Alternatively, in another aspect of the present invention, once the BTS 418 determines which sector the mobile device 410 should bias, it communicates this information to each sector, such as sector A 412, sector B 414, and sector C 416 and instructs the sectors that are not the bias sector not to communicate power control commands to the mobile device 410 for the remainder of the frame. Referring to the example given above, sector B 414 and sector C 416 would not send a power control command to the mobile device 410 for the remainder of time slots in that particular frame, as the mobile device 410 will receive from and obey the power control commands of only sector A 412. The power control commands are represented by items 422, 424, and 426 for sector A 412, sector B 414, and sector C 416, respectively.

In another embodiment of the present invention, the sector that the mobile device biases is determined by a frame error rate associated with each sector. A vocoder, such as that shown in FIG. 4 represented by item 419, may be used to determine a frame error rate, and this information may be used by the BTS 418, for instance, to select the sector that is receiving the highest quality signals 420 from the mobile device 410. A vocoder is a voice coder that synthesizes speech. A speech analyzer converts analog waveforms into narrowband digital signals. The BTS 418, in this embodiment, selects the bias sector based on the output of the vocoder 419. As was the case with the embodiment described above, the BTS 418 may notify either the sectors or the mobile device as to which sector the mobile device should bias. If the BTS 418 notifies each of the sectors, only the bias sector may continue communicating power control commands to the mobile device 410 for the current frame, and as such the mobile device 410 will receive only one power control command for each time slot of the current frame. In one instance, the bias sector corresponds to the sector having a lowest average frame error rate among a predetermined number of previous frames (e.g., 100 frames). Alternatively, if the BTS 418 notifies the mobile device 410 which sector it should bias, the mobile device 410 may receive multiple power control commands (e.g., one from each sector per time slot of the frame) for each time slot but will know to obey the power control command sent from the bias sector.

Figure 5:
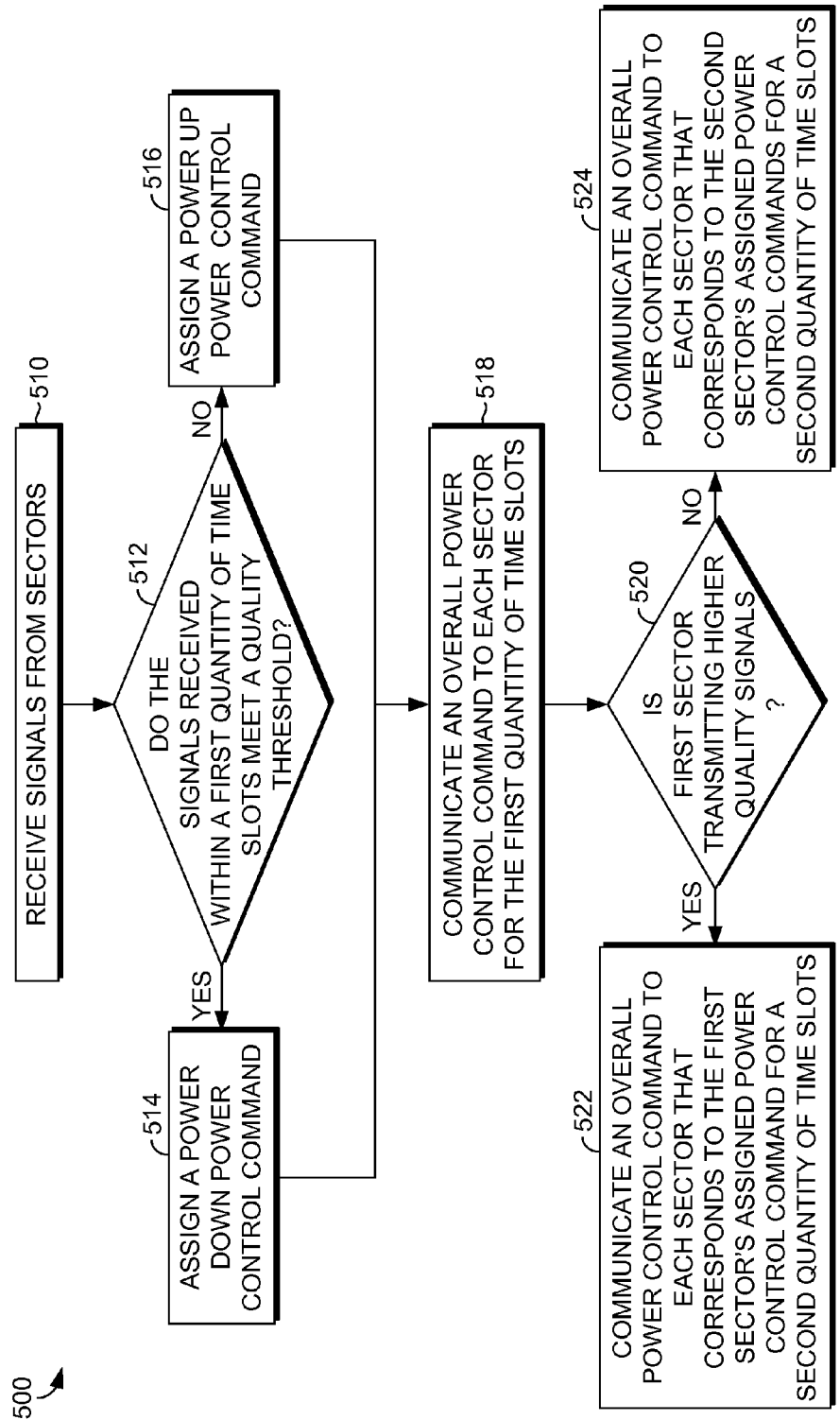
FIG. 5 depicts a flowchart of a method for determining whether sectors should increase or decrease their power output, in accordance with an embodiment of the present invention.

Referring to FIG. 5, a flowchart is shown of a method 500 for determining whether sectors should increase or decrease their power output, in accordance with an embodiment of the present invention. The embodiment of FIG. 5 illustrates forward power control, as signals are communicated from the sectors to the mobile device, or the forward link. Further, the mobile device, in one embodiment, performs the steps detailed below. Initially, signals are received from multiple sectors at step 510. In one instance, signals are received from a first sector and a second sector. The sectors may be associated with the same cell tower, or with different cell towers. At step 512, it is determined whether the signals received within a first quantity of time slots meet a quality threshold. This may be determined by comparing the incoming signals to a target signal, wherein the quality of the target signal may vary, and may be determined by a network component. The first quantity of time slots may comprise a portion of a frame. In one embodiment, a frame comprises sixteen time slots. For instance, if the frame is 20 ms, each time slot is 1.25 ms. In embodiments, the mobile device receives the signals and determines whether the signals meet the quality threshold.

The signals are then assigned a power control command. If a signal is determined to meet the quality threshold, it is assigned a power control command of "power down," shown at step 514. If the signal does not meet the quality threshold, it is assigned a power control command of "power up," shown at step 516. Generally, if a signal does not meet a quality threshold, a subsequent signal needs a higher power output, and therefore a "power up" command instructs the sector from which the signal was sent to increase its power. Similarly, if a signal does meet a quality threshold, a subsequent signal may not need as high of a power output, so that a "power down" command is sent to the sector from which the signal was sent. This allows for the mobile device and the sectors to attempt to achieve an equilibrium based on distance in terms of power levels. In embodiments, the mobile device assigns the power control commands.

At step 518, an overall power control command is communicated to each sector for the first quantity of time slots. In one embodiment, the mobile device is able to send only the same power control command to each of the sectors, and as such, each sector receives an identical power control command. Further, an overall power control command may be determined based on the assigned power control commands to each of the sectors. For instance, in one embodiment, if one or more of the power control commands for a particular time slot are power down or "0," the overall power control command for that time slot is also "0" or power down. This is so that the mobile device and the sectors can work to achieve equilibrium in terms of power. If the signal qualities are continually higher than the quality threshold, excess power is being used that could be conserved. In this embodiment, it is only when all power control commands for a particular time slot are "1" or power up that the overall power control command will also be "1" or power up. As mentioned above, a power control command is assigned to each sector for each of a first quantity of time slots. The first quantity of time slots can be any number, but is likely less than the total number of time slots in a frame, and thus comprises at least a portion of a frame. In one embodiment, the first quantity of time slots is five, but in another embodiment, the first quantity of time slots is three. The same overall power control command may be sent to each of the sectors.

It is determined at step 520 whether the first sector is transmitting higher quality signals than the second sector. If so, for a second quantity of time slots, an overall power control command is communicated to each sector that corresponds to the first sector's assigned power control command, shown at step 522. If not, for the second quantity of time slots, the overall power control command is communicated to each sector that corresponds to the second sector's assigned power control command, shown at step 524. For exemplary purposes only and not limitation, if the first quantity of time slots equals the first five time slots of a frame and it is determined, for those first five time slots, that the first sector is communicating higher quality signals than the other sectors, the overall power control command communicated to the sectors for the sixth time slot is the power control command assigned to sector A for the sixth time slot based on the signal transmitted from sector A during that time period. Conversely, if sector B's signal is of a higher quality than sector A's for the first five time slots, the overall power control command for the sixth time slot is the power control command assigned to sector B for the sixth time slot based on sector B's signal transmitted to the mobile device during that time period.

Further, if there is a third sector that is communicating signals to the mobile device at that time, the third sector's power control command for each of the second quantity of time slots is used as the overall power control command for the corresponding time slot of the second quantity of time slots. As such, in one embodiment, a plurality of signals are received from a third sector. Each signal is inspected that has been received within a quantity of time that comprises each of the first quantity of time slots to determine whether each signal meets the quality threshold. As mentioned, if the third sector is determined to be transmitting higher quality signals, the overall power control command communicated to the first, second, and third sectors for each of a second quantity of time slots corresponds to the power control command assigned to the third sector for the corresponding time slot.

Figure 6:
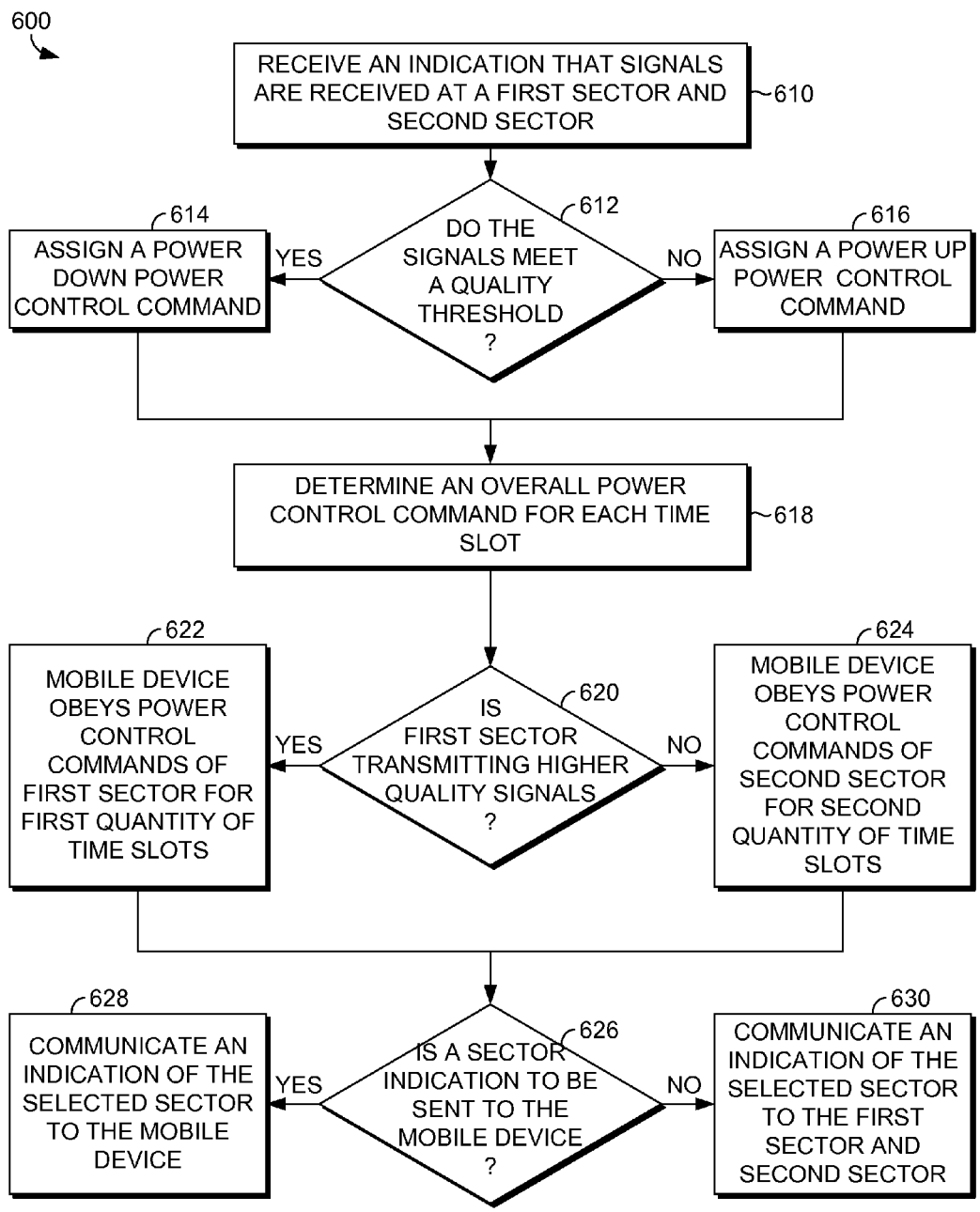
FIG. 6 depicts a flowchart of a method for determining whether a mobile device should increase or decrease its power output, in accordance with an embodiment of the present invention.

Turning now to FIG. 6, a flowchart is illustrated of a method 600 for determining whether a mobile device should increase or decrease its power output, in accordance with an embodiment of the present invention. The steps described below may be performed by the BTS, in one embodiment. This embodiment exemplifies reverse power control, as a signal is sent from the mobile device to multiple sectors (e.g., reverse link) during soft handoff. Initially, an indication is received that signals are received at a first sector and a second sector, shown at step 610. At step 612, it is determined whether the signals meet a quality threshold. If so, a power down power control command is assigned, at step 614, to the sector that sent the signal for that particular time slot of the frame. If a signal does not meet a quality threshold, a power up power control command is assigned to the sector that sent the signal for that particular time slot, shown at step 616. Once power control commands are assigned for a particular time slot, an overall power control command is determined for that time slot at step 618. In one embodiment, if one or more power control commands of a sector for a particular time slot are power down, or "0," the overall power control command is also "0." However, the overall power control command is power up or "1" only if each power control command assigned in that particular time slot is also "1."

Once overall power control commands have been communicated to the sectors for the first quantity of time slots, at step 620, it is determined whether the first sector is transmitting higher quality signals than the other sectors based on the first quantity of time slots. If so, the overall power control command for each of a second quantity of time slots, or time slots corresponding to the remainder of the frame, corresponds to the first sector's assigned power control commands for the corresponding time slot, as shown at step 622. At step 624, if the first sector is not transmitting higher quality signals, the overall power control command for each of a second quantity of time slots corresponds to the second sector's assigned power control commands for the corresponding time slot.

At step 626, it is determined whether a sector indication is to be sent to the mobile device or to the sectors. For instance, as shown at step 628, the mobile device may be notified as to which sector has been receiving higher quality signals from the mobile device for the first quantity of time slots so that the mobile device, while it may still communicate signals to each sector, will know to obey the power control commands sent from the selected sector. If not the mobile device, an indication of the selected sector may be communicated to the first sector and the second sector, shown at step 630. In this instance, only the selected sector, or the sector receiving the highest quality signals, may communicate its assigned power control command to the mobile device for the remainder of the time slots of the frame. As such, the mobile device will adjust its power of a subsequent signal communicated to the first and second sectors based on the power control commands received from the selected sector.

FIG. 7 depicts a flowchart of a method 700 for using historical frame quality information to determine how to adjust power output, in accordance with an embodiment of the present invention. At step 710, historical frame quality information is received. This information may be received at one of several components, such as a mobile device that is communicating or receiving signals to or from multiple sectors. In this instance, the mobile device may perform the steps outlined below. Alternatively, the information may be received at a BTS that may perform the steps outlined below. Prior to receiving the historical frame quality information, a request may be made for the information. This frame quality information may be associated with a predetermined quantity of frames previous to the current frame. For instance, the past 100 frames may be analyzed. In embodiments, the historical frame quality information indicates a frame error rate for each frame. Generally, a frame error rate indicates a quality of signals communicated between a mobile device and various sectors. Alternatively to frame error rate, an embodiment of the present invention looks at the number of times that the power control command associated with each sector was utilized for each time slot for a predetermined number of previous frames. For instance, if the power control commands associated with sector A were utilized (obeyed or instructed) 90% of the time and sector B was 10%, the current frame would utilize the power control commands associated with sector A.

At step 712, based on the frame error rates, a sector is selected from two or more sectors that has a lowest average frame error rate throughout the predetermined quantity of frames. In an alternate embodiment, a sector is selected based on the number of previous frames in which a particular sector has the lowest corresponding frame error rate compared to the other sectors. At step 714, for each time slot that comprises a current frame, power control commands received from the selected sector are obeyed. As such, if sector A is selected as the sector that has provided the lowest frame error rates over the course of the predetermined quantity of frames, the mobile device will utilize the power control commands associated with that sector. In one embodiment, the mobile device obeys the power control commands associated with the selected sector, or adjusts its power based on the power control commands assigned to the selected sector. This would be the case for reverse power control. In an alternate embodiment, in the case of forward power control, the mobile device determines an overall power control command based on the selected sector, or based on the quality of signals received from the selected sector. The desired outcome of the embodiment of FIG. 7 is that the frame quality would be higher for the current frame than it would have been if other methods for selecting a sector would have been used.

In the case of forward power control where signals are communicated from the sectors to the mobile device, the mobile device may record or determine the frame error rate for each sector, and based on this, select the bias sector. An overall power control command may then be transmitted to each sector. However, in the case of reverse power control where signals are communicated from the mobile device to the sectors, the vocoder output is analyzed and a frame error rate is determined for a number of previous frames. A bias sector is selected based on the frame error rate, and either the mobile device or each sector is informed as to which sector has the lower frame error rate over those previous frames.

In alternate embodiments, a sector is biased based on the quality of the signals either communicated to or received from the sectors. Signal quality may include various factors that are analyzed either individually or in combination with other factors. For exemplary purposes only and not limitation, these factors include signal strength (e.g., signal-to-noise ratio), line of sight, distance between a mobile device and a sector, loading (e.g., forward loading and reverse loading), quantity of traffic channels, reverse power, etc. Here, instead of analyzing the power control commands received at the mobile device for reverse power control, for example, one or more of current or previous signal quality associated with a particular sector is used to determine the sector receiving the best quality signals from the mobile device. For forward power control, the mobile device or the BTS may receive signal quality data and decide which sector is communicating higher quality signals. Based on this, the overall power control commands communicated from the mobile device to the sectors is consistent with the power control commands associated with the sector communicating the highest quality signals out of the sectors in the coverage area. This may include two or more sectors during soft handoff. The sectors may be associated with a single cell tower or with different cell towers. FIGS. 8-10 illustrate various aspects of these alternate embodiments.

FIG. 8 depicts a flowchart of a method 800 for forward power control using previous signal quality data, in accordance with an embodiment of the present invention. Initially, at step 810, signal quality data is received for a predetermined quantity of previous frames. In one embodiment, each of the previous frames comprises sixteen time slots. The predetermined quantity may be any number and may vary, but in one embodiment, it is twenty frames. These previous frames may be the immediate previous frames such that the signal quality data for these frames is up-to-date. The signal quality data indicates a quantity of signals communicated to a mobile device from various sectors, such as a first sector and a second sector. As mentioned above, these sectors are in a coverage area of the mobile device such that the mobile device receives or communicates signals from/to multiple sectors during soft handoff. The sectors may be from a single cell tower or from multiple cell towers. Based on the signal quality data, a sector is selected from the first sector and the second sector that is communicating higher quality signals, shown at step 812.

The signal quality data may include various factors, such as, loading, signal-to-noise ratio, reverse power, or a quantity of traffic channels. Loading indicates an amount of traffic associated with a particular sector. Reverse loading is typically used, but forward loading may also be used. As a result, if the coverage area of three sectors overlaps and the mobile device is located within that overlapped area, the forward link, or the signal communicated from the sectors to the mobile device typically is of a lower quality because of the interference associated with the other overlapping sectors. The quality of the reverse link, or the signals communicated from the mobile device to the sectors depends on how many mobile devices are sending signals simultaneously. A signal-to-noise ratio is a ratio of a signal quality from a particular sector to noise from everywhere in the spectrum. Forward signal-to-noise ratio is typically used, but reverse signal-to-noise ratio may also be used. A quantity of traffic channels may also be used to determine RF conditions, and is used as an indication of load. As mentioned, these factors may be used independently or in conjunction with each other. In one instance, reverse loading is used to determine the quality of a signal, but if unavailable, forward signal-to-noise ratio may be used.

Signals are received from the first sector and the second sector in the current frame. Power control commands are assigned to each sector for each time slot that comprises the current frame. Initially, a power control command is assigned to a first time slot of the current frame, and the mobile device listens to the power control command associated with the selected sector. In one embodiment, the power control commands are assigned based on whether the signal meets a quality threshold. This threshold may be determined by the network, in one instance. This process is repeated for each time slot. At step 814, an overall power control command is communicated to the sectors for each time slot that comprises a current frame, such that the overall power control command corresponds to a power control command associated with the selected sector. For instance, if the first sector is selected at step 812 based on its signal quality, the power control command assigned by the mobile device to the first sector is used as the overall power control command, which is sent to both the first sector and the second sector. The mobile device listens only to the power control commands sent from the first sector, as the first sector has been sending the highest quality signals for the predetermined quantity of previous frames.

For example, if the first sector is the selected sector and the power control command associated with the first sector is "0" or power down, the overall power control command for that particular time slot is also "0" indicating that the output power for a subsequent signal communicated from the sectors to the mobile device can decrease. Alternatively, if the power control command is "1" or power up, the overall power control command for that particular time slot is also "1" indicating that the output power for a subsequent signal communicated from the sectors to the mobile device should increase.

In one embodiment, signal quality data is received for the predetermined quantity of previous frames that indicate the quality of the signals communicated from a third sector. A sector is then selected from the first sector, the second sector, and the third sector that is communicating the highest quality signals. The overall power control command is then communicated to each of the sectors, and the overall power control command corresponds to the power control command associated with the selected sector. In embodiments, more than three sectors simultaneously communicate signals to a mobile device.

Turning to FIG. 9, a flowchart is illustrated of a method 900 for reverse power control using previous signal quality data, in accordance with an embodiment of the present invention. At step 910, signal quality data is received for a predetermined quantity of previous frames. The signal quality data indicates a quality of signals communicated from a mobile device to multiple sectors, such as a first sector and a second sector. At step 912, a sector is selected from the first and second sectors based on whether the signals communicated to the first sector or second sector during the predetermined quantity of previous frames are of a higher quality. In one instance, the selection of the sector occurs during soft handoff, when there would be two or more sectors receiving signals from the mobile device. Power control commands are received at step 914 from each of the first sector and the second sector for each time slot that comprises a current frame.

At step 916, an output power corresponding to the signals communicated from the mobile device to the sectors is adjusted in a current frame according to the power control commands received from the selected sector. For example, if the first sector is selected as the sector that has been receiving the highest quality signals for the predetermined quantity of previous frames, the mobile device will adjust its output power according to the power control command received from the first sector. For instance, if the first sector's power control command is "0" or power down, the mobile device will decrease its output power for a subsequent signal communicated to the sectors. Alternatively, if the first sector's power control command is "1" or power up, the mobile device will increase its output power for a subsequent signal communicated to the sectors. As such, for the current frame, the mobile device will obey the power control commands associated with the selected sector. In a further embodiment, the signal quality data may indicate the quality of signals communicated from the mobile device to a third sector. One of the first sector, the second sector, or the third sector is selected based on whether the signals communicated to the sectors are of a higher quality. Additionally, the power control commands are received from the third sector.

Referring now to FIG. 10, a flowchart of a method 1000 for forward power control using current signal quality data is shown, in accordance with an embodiment of the present invention. Initially, at step 1010, two or more sectors are identified within a coverage area of a mobile device. This may occur during soft handoff, for example, when a mobile device is simultaneously connected to two or more sectors or cells during a call. At step 1012, current signal quality data for signals received from the two or more sectors is retrieved. A sector is selected from the two or more sectors, shown at step 1014, based on the current signal quality data. The current signal quality data indicates, for example, forward signal-to-noise ratio, reverse loading, and/or a quantity of traffic channels. A distance from the mobile device to each of the sectors and a line of sight to each sector may also be used to determine signal quality.

At step 1016, an overall power control command is determined for each of a plurality of time slots that comprise a current frame. The overall power control command corresponds to a power control command associated with or assigned to the selected sector. The overall power control command is communicated to the two or more sectors at step 1018. In one embodiment, in addition to using current signal quality data, signal quality data for a predetermined quantity of previous frames associated with the mobile device may also be used to select a sector to bias for the current frame.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. One or more non-transitory computer-readable media storing computer-useable instructions that, when used by one or more computing devices, cause the one or more computing devices to perform a method comprising:
   receiving signal quality data for a predetermined quantity of previous time slots in a current frame, wherein the signal quality data indicates a quality of signals communicated to a mobile device from a first sector and a second sector;
   based on the signal quality data, selecting a sector from the first sector and the second sector that is communicating higher quality signals, wherein the signal quality data includes one or more of loading, a signal-to-noise ratio, or a quantity of traffic channels; and
   for the remainder of time slots in the current frame, communicating an overall power control command to each of the first sector and the second sector that corresponds to a power control command associated with the selected sector.

2. The one or more computer-readable media of claim 1, wherein the predetermined quantity of previous frames is twenty.

3. The one or more computer-readable media of claim 1, wherein each of the previous frames comprises sixteen time slots.

4. The one or more computer-readable media of claim 1, further comprising:
   receiving signal quality data for the predetermined quantity of previous frames that indicate the quality of the signals communicated from a third sector;
   selecting a sector of the first sector, the second sector, and the third sector that is communicating the higher quality signals; and
   communicating the overall power control command to each of the first sector, the second sector, and the third sector that corresponds to the power control command associated with the selected sector.

5. The one or more computer-readable media of claim 1, wherein the first sector and the second sector are associated with a single cell tower.

6. The one or more computer-readable media of claim 1, wherein the first sector and the second sector are associated with different cell towers.

7. The one or more computer-readable media of claim 1, further comprising receiving the signals from the first sector and the second sector in the current frame.

8. The one or more computer-readable media of claim 7, further comprising for the signals received in a time period associated with the each time slot that comprises the current frame, assigning the power control command to the first sector and the second sector.

9. The one or more computer-readable media of claim 8, wherein the power control command is assigned based on whether each of the signals meets a quality threshold.

10. The one or more computer-readable media of claim 1, wherein the selected sector is the first sector and wherein the power control command associated with the first sector and the overall power control command is "0," indicating that a decrease in power is requested.

11. The one or more computer-readable media of claim 1, wherein the selected sector is the first sector and wherein the power control command associated with the first sector and the overall power control command is "1," indicating that an increase in power is requested.

12. One or more non-transitory computer-readable media storing computer-useable instructions that, when used by one or more computing devices, cause the one or more computing devices to perform a method comprising:
    during a soft handoff, identifying two or more sectors within a coverage area of a mobile device;
    retrieving current signal quality data for signals received from the two or more sectors in a predetermined quantity of previous time slots in a current frame;
    selecting a sector from the two or more sectors based on the current signal quality data that indicates one or more of forward signal-to-noise ratio, reverse loading, or a quantity of traffic channels;
    determining an overall power control command for the remainder of time slots that comprise the current frame, wherein the overall power control command corresponds to a power control command associated with the selected sector; and
    communicating the overall power control command to the two or more sectors.

13. The one or more computer-readable media of claim 12, further comprising retrieving signal quality data for a predetermined quantity of previous frames, wherein the signal quality data indicates a quality of signals communicated to the mobile device from the two or more sectors.

14. The one or more computer-readable media of claim 12, wherein both the current signal quality data and the signal quality data for the predetermined quantity of previous frames are used to select the sector.

15. The one or more computer-readable media of claim 12, wherein the current signal quality data further indicates a distance from the mobile device to each of the two or more sectors.

\* \* \* \* \*